(12) United States Patent
Conner et al.

(10) Patent No.: US 7,401,176 B2
(45) Date of Patent: Jul. 15, 2008

(54) METHOD AND SYSTEM FOR FAST ACCESS TO STACK MEMORY

(75) Inventors: Joshua M. Conner, Apache Junction, AZ (US); James H. Grosbach, Scottsdale, AZ (US); Joseph W. Triece, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 438 days.

(21) Appl. No.: 10/969,513

(22) Filed: Oct. 20, 2004

(65) Prior Publication Data
US 2005/0091471 A1   Apr. 28, 2005

Related U.S. Application Data

(60) Provisional application No. 60/514,029, filed on Oct. 24, 2003.

(51) Int. Cl.
*G06F 12/00* (2006.01)
(52) U.S. Cl. .............................. 711/5; 712/208; 712/220
(58) Field of Classification Search ........................ 711/5
See application file for complete search history.

(56) References Cited

U.S. PATENT DOCUMENTS 6,708,268 B1 * 3/2004 Boles et al. ................. 712/220
2004/0177211 A1 9/2004 Boles et al. .................... 711/5

FOREIGN PATENT DOCUMENTS

EP     0 918 279     10/1998
WO    WO 00/58828   10/2000

OTHER PUBLICATIONS

PCT Search Report based on PCT/US04/034727, 8 pages, Mailed Feb. 11, 2005.

* cited by examiner

*Primary Examiner*—Donald Sparks
*Assistant Examiner*—Matthew Bradley
(74) *Attorney, Agent, or Firm*—Baker Botts LLP (57) ABSTRACT

Fast access of a memory having a stack uses an address bit, a stack pointer, and fast access random access memory ("RAM"). When a first address mode is used in conjunction with the address bit and the stack pointer, the location of the access RAM can be shifted in order to achieve an index of a literal offset address mode.

10 Claims, 6 Drawing Sheets

METHOD AND SYSTEM FOR FAST ACCESS TO STACK MEMORY

CROSS REFERENCE TO RELATED APPLICATION

This application is a conversion of U.S. Provisional Application Ser. No. 60/514,029 that was filed on Oct. 24, 2003 by the same inventors for the same inventive entity, and is herein incorporated by reference for all purposes.

FIELD OF THE INVENTION

The present invention relates generally to microprocessors. More specifically, the present invention is related to accessing general-purpose memory that is used as a stack data structure in microcontrollers and microprocessors.

BACKGROUND OF THE INVENTION TECHNOLOGY

Microcontroller units (MCU) have been used in the manufacturing and electrical industries for many years. In any microprocessor or microcontroller, there are memory locations (i.e., RAM) that are used to hold intermediate values. Those memory locations can be used to implement a conceptual data container called a "stack." A stack is a structure that behaves like a linear list for which all insertions and deletions are made at one end of the list. The rules or axioms that specify what a stack is can be stated in terms of three operations, commonly called push, pop, and top. Push adds an item to a stack, pop deletes the most recently added item, and top returns that item, leaving the stack unchanged. A stack is used for a variety of software applications that execute on the microcontroller.

Most microcontrollers have a limited memory resources. The amount of memory resources can be increased through the use of software stacks. A software stack is a method where a set of data locations are used for storing context that is local to one part of a whole computer program. This method allows for efficient RAM usage, because only the portion of a computer program which is currently active consumes RAM space. The software stack is implemented by having a dedicated pointer that indicates the top of the stack. The dedicated pointer is commonly called the stack pointer. Data may be added to, or removed from, the software stack by manipulating the stack pointer. Data in the stack may also be referenced by using "stack-pointer relative addressing" whereby an offset from the stack pointer is used to address data.

Figure 1:
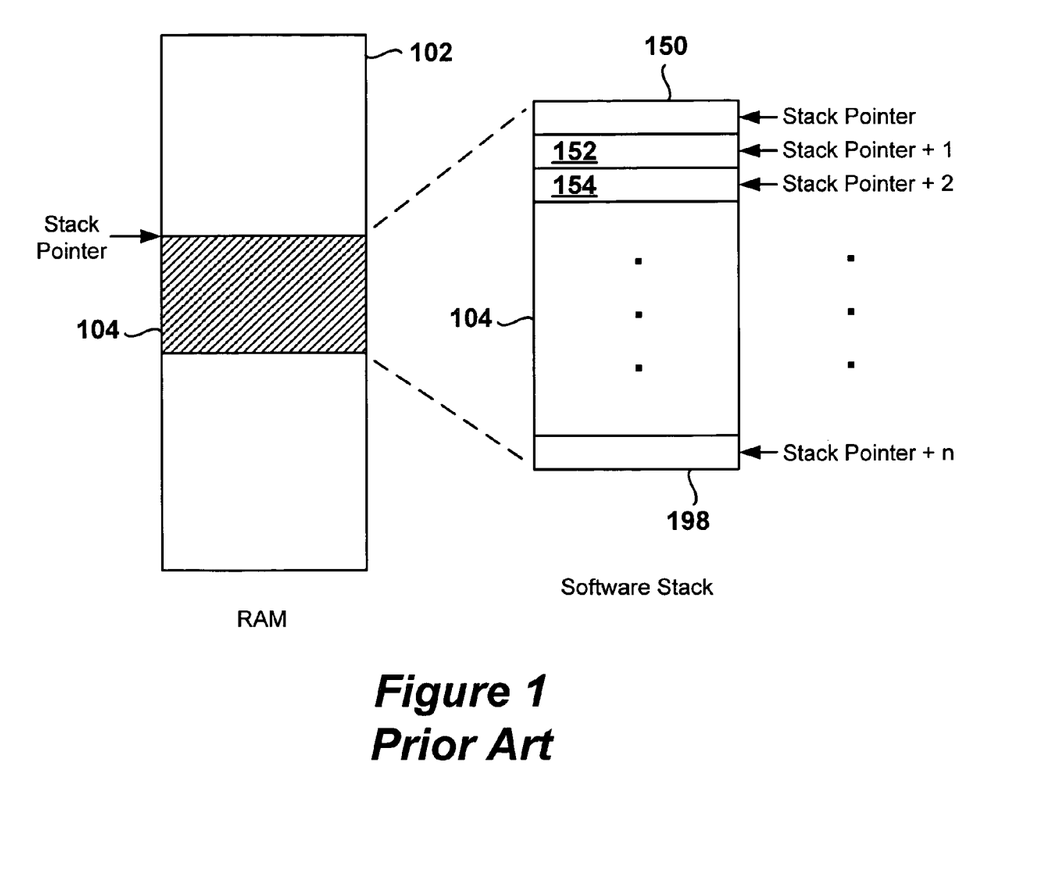
FIG. 1 is a block diagram illustrating an implementation of a stack in general-purpose memory of a conventional microcontroller.

FIG. 1 illustrates the use of RAM to create a software stack. Specifically, a portion of the RAM 102 is reserved as a software stack 104. An expanded view of the software stack 104 is illustrated on the right side of FIG. 1. Specifically, the software stack 104 has a stack pointer 150, as well as additional registers that are accessible using an offset from the stack pointer 150. For example, the register 152 that is adjacent to the stack pointer 150 is accessible as stack pointer +1. Similarly, the register adjacent to the register 152 is offset by two from the stack pointer 150. The stack contains 'n' registers, with the last register 198 being offset from the stack pointer by the number 'n' as illustrated in FIG. 1.

Because many high-level languages are designed in such a way that use of a software stack is necessary, the overall performance of software applications written with a high-level language is dependent upon the microcontroller's ability to process efficiently the stack-relative operations. Fast software stack access and manipulation can improve overall performance. As faster performance for software applications is desired, there is a need, therefore, for decreasing the time needed to access and/or manipulate the software stack.

SUMMARY OF THE INVENTION

The invention overcomes the above-identified problems as well as other shortcomings and deficiencies of existing technologies by providing a microcontroller that has a portion of memory reserved for fast memory access, and by remapping this memory onto the stack for fast access.

The present invention includes a method, system and apparatus for providing fast access to memory in a stack. The system and apparatus include an address bit, a stack pointer, and fast access random access memory ("RAM"). The method enables a first address mode to be used, in conjunction with the address bit and the stack pointer, to shift the location of the access RAM and to achieve index of literal offset address mode.

Features and advantages of the invention will be apparent from the following description of the embodiments, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

A method and apparatus are disclosed to enable fast access of memory in a stack. Specifically, the present disclosure describes a microcontroller that has access bits for fast memory access, and those fast access bits are redirected for fast stack access. By decreasing the time necessary for stack access, overall performance of the microcontroller may be enhanced. Thus, it is an advantage of the present invention that it provides faster access to the stack, and thus faster overall performance of the microcontroller.

Typical high-level software applications (programs) use function subroutines with parameters and local variables, such as the code sample below:

```
void foo( char a, char b)
{
    int c;
    char d;
    d = 5;
    c = a + b + d;
}
```

On standard architecture microcontrollers, a simple statement such as "d=5" might translate, in assembly language, to:

```
MOVLW    0x5
MOVWF    PRODL, 0x0
MOVLW    0x2
MOVFF    PRODL, PLUSW2
```

The above code utilizes 10 bytes of program memory, which may be a significant amount of overhead for some devices and/or some applications. It may be desirable to reduce the amount of overhead for increased performance.

The overhead can be reduced by taking as expendable access RAM for high-level programming. In other words, most software applications written from a high-level do not utilize access RAM to the same degree as other applications. Consequently, a trade-off can be made to decrease the time needed for memory access by precluding certain functionality which, in the case of high-level software applications, may not be essential. In this disclosure, the trade off may be accomplished by re-mapping the access bit so that it identifies the stack-relative address rather than the fast memory addresses.

Referring now to the drawings, the details of an exemplary embodiment of the present invention is schematically illustrated. Like elements in the drawings will be represented by like numbers, and similar elements will be represented by like numbers with a different lower case letter suffix.

Figure 2:
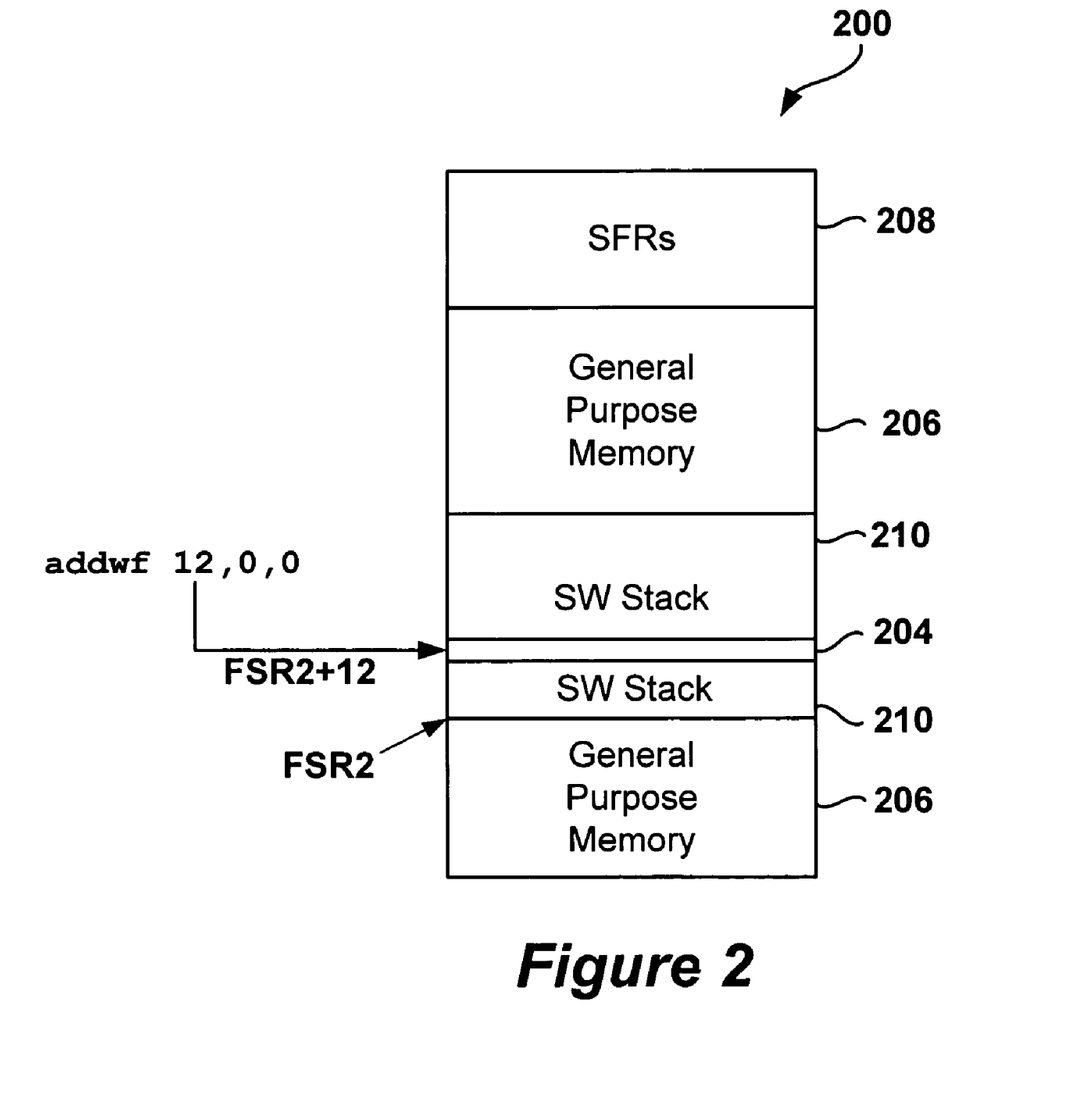
FIG. 2 is a block diagram illustrating an embodiment of the fast access memory stack according to the teachings of the present invention.

The stack of an embodiment the present disclosure is illustrated in FIG. 2. Specifically, the stack 200 contains general purpose memory 206. Within the general purpose memory 206 may be a software stack 210. The special function registers 208 of the stack 200 may reside toward the top of the memory, e.g., in proximity to the end address 0xfff as illustrated in FIG. 2. It should be noted that the particular location of the SFRs or the general purpose memory are not central to the present invention, and the specific location of the memory, or the specific size of the stack memory may be capable of wide variation.

Some prior art microcontrollers used an "access bit" when accessing memory in the stack, with the access bit identifying fast memory addresses. In contrast, in the embodiments of the present disclosure, the access bit may be remapped so that it identifies stack-relative addresses rather than the fast memory addresses of the prior art microcontrollers. While such a re-mapping may preclude access RAM, the arrangement without access RAM has advantages. Specifically, the arrangement of the stack 210, in conjunction with the re-mapping of the access bit to identify stack-related addresses, results in better overall performance of the microcontroller unit. For example, using the enhanced stack addressing scheme of the present invention may allow the code for "b=5" to be translated (in assembly language) to:

```
MOVLW    0x5
MOVWF    b, 0x1
``` that has two fewer instructions and uses only 4 bytes of program memory, which is a 60% reduction over the preceding example.

The addressing mode disclosed herein may be enabled by programming a context by, for example, setting an "access bit" to '1'. The access bit may be implemented as a fuse, another hardware mechanism, or the access bit may also be implemented in software. When the access bit is programmed to be enabled, the indexed address with literal offset mode may be address dependant and may also depend upon the value of the access bit in the instruction word. The access bit enabled mode will only apply to instructions that use direct short or direct forced addresses. It will be understood that those skilled in the art will be able to create alternate embodiments with different values for the index bit, or with different mechanisms for conveying context and the example provided herein is merely illustrative.

In the embodiment described above, if the access bit is a '1' (one), then there may be no change in how the address is determined from the previous architecture (i.e., the memory architecture of FIG. 1), and the addressing mode can default to direct short. If the value of the access bit is set to '0' (zero), the address contained in the instruction word can be decoded and compared to the (hex) value 05 Fh. If the address is greater than 05 Fh, the addressing mode can be decoded as direct forced. If the value of the access bit is zero, and the address in the instruction word is less than or equal to 05 Fh, then addressing mode can be indexed with a literal offset. When the addressing mode is indexed with a literal offset, the address in the instruction word can default to a literal value that can be added to the contents of a dedicated pointer register that is used to mark the top of a stack. The resulting value can then be used as an address upon which the operation may be conducted.

Figure 3:
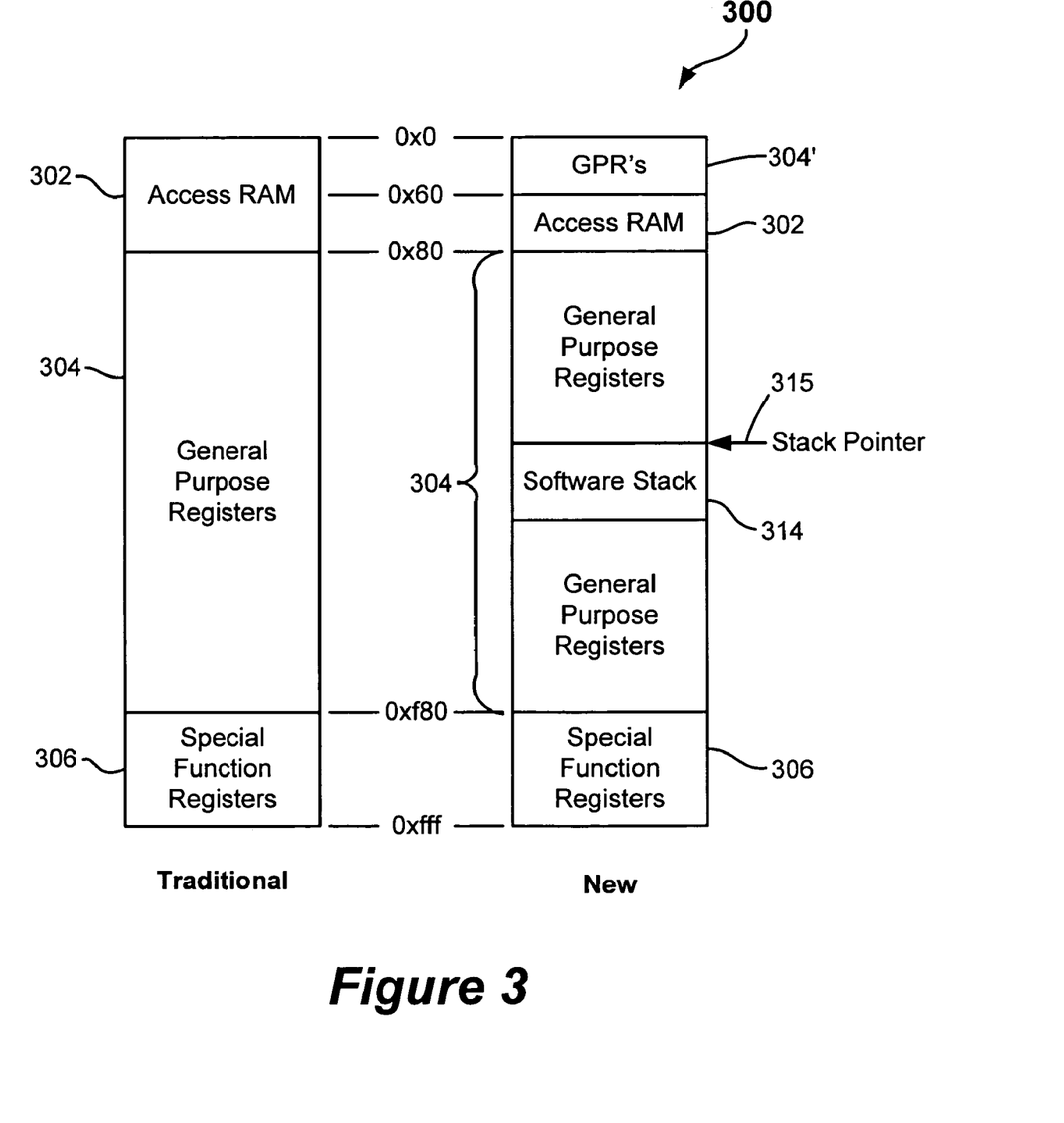
FIG. 3 is a block diagram illustrating literal offset addressing mode according to the teachings of the present invention.

FIG. 3 illustrates access operations on the RAM 300. Specifically, the traditional RAM 300 (on the left side of FIG. 3) is divided into separate banks, such as access RAM 302, general purpose registers 304 and special function registers 306. In the embodiment of the RAM 300 illustrated in FIG. 3, the memory addressing is between the range 0x0 and 0xfff. In contrast to the traditional RAM organization 300, there is the present RAM organization 300 illustrated on the right side of FIG. 3. In the new bank configuration, the top of the RAM 300' has general purpose registers 304', followed by access RAM 302. There is another set of general purpose registers 304' containing the software stack 314. At the top of the software stack 314 is the stack pointer 315. The special function registers 306 round out the remainder of the RAM organization 300'. There is a mechanism disclosed herein that enables the access of values in the software stack 314 via offset literal addressing, whereas the traditional architecture might have accessed absolute address (e.g. "12" (12,0,0) of FIG. 2) in the access RAM, the present architecture would access that address relative to the stack pointer, in the software stack.

Figure 4:
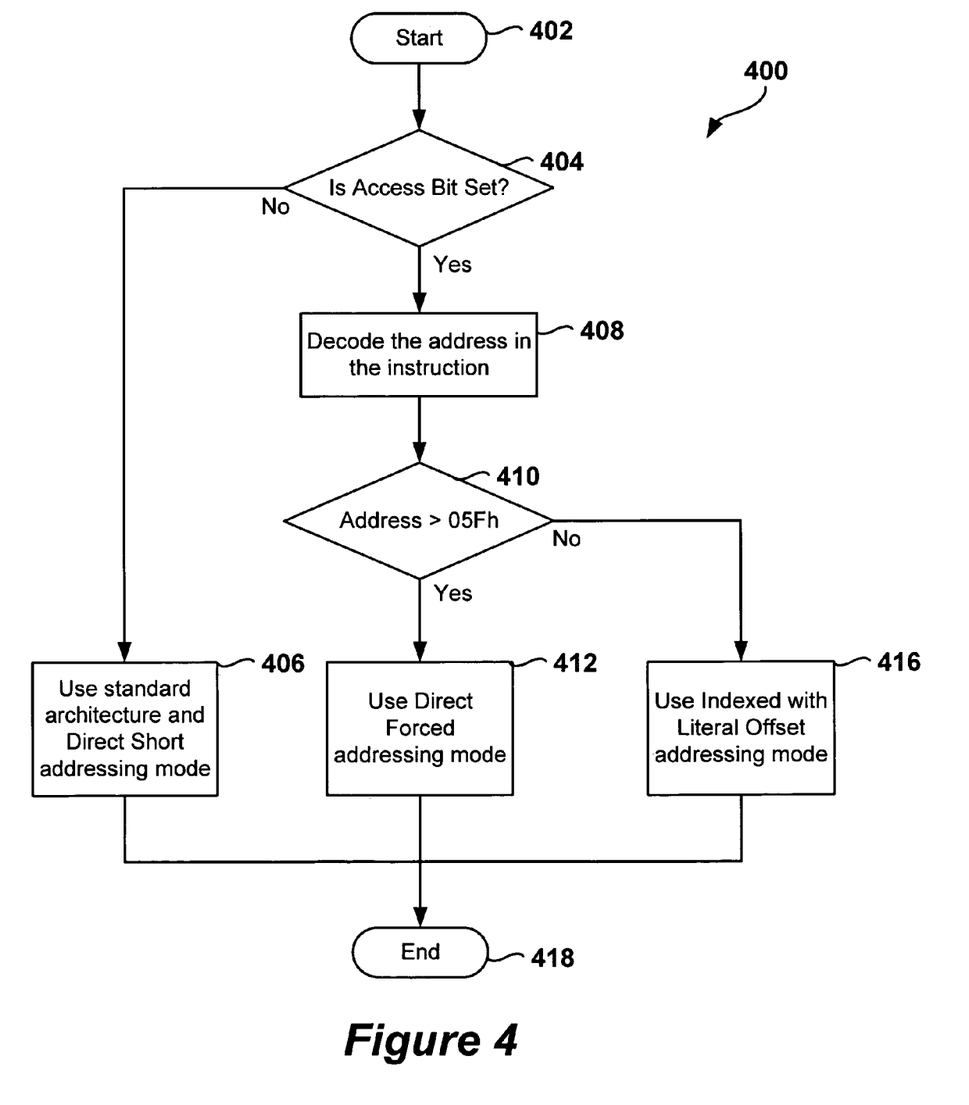
FIG. 4 is a flowchart illustrating a mode designation procedure according to an embodiment of the present invention.

FIG. 4 is a flowchart illustrating the mode designation method 400. The method begins generally at step 402. A check may be made in step 404 to determine if the access bit is set. If not, then the standard architecture may be used and the Direct Short addressing mode may be chosen in step 406. If the access bit is set, then the instruction may be decoded in step 408 to extract the address. In step 410, a check may be made to determine if the address is greater than a pre-defined value, such as 05 Fh. The pre-determined value can vary from device to device, and may depend upon the amount of RAM available, and the applications for the device in question. If the address is greater than the pre-defined value, then the Direct Forced addressing mode may be chosen in step 412. If not, the indexed with literal offset addressing mode may chosen in step 416. After the addressing mode is chosen, the method ends generally at step 418. If should be noted that, depending upon the number of desired addressing modes, one or more of the steps outlined above may be obviated. However, in some cases, further checks may be made with the address value to determine whether other addressing modes are to be selected. The method of FIG. 4 is merely illustrative and should be taken as an example of the myriad check that may vary in kind and character to select one or more addressing modes.

One implication for the embodiment described above may be that the direct forced mode is not available for addresses less than or equal to the pre-determined value when this mode is enabled. Moreover, all other forms of indirect addressing are unaffected by indexed with literal mode because all other indirect modes are decoded by data memory addresses in a range greater than the pre-determined value.

Figure 5:
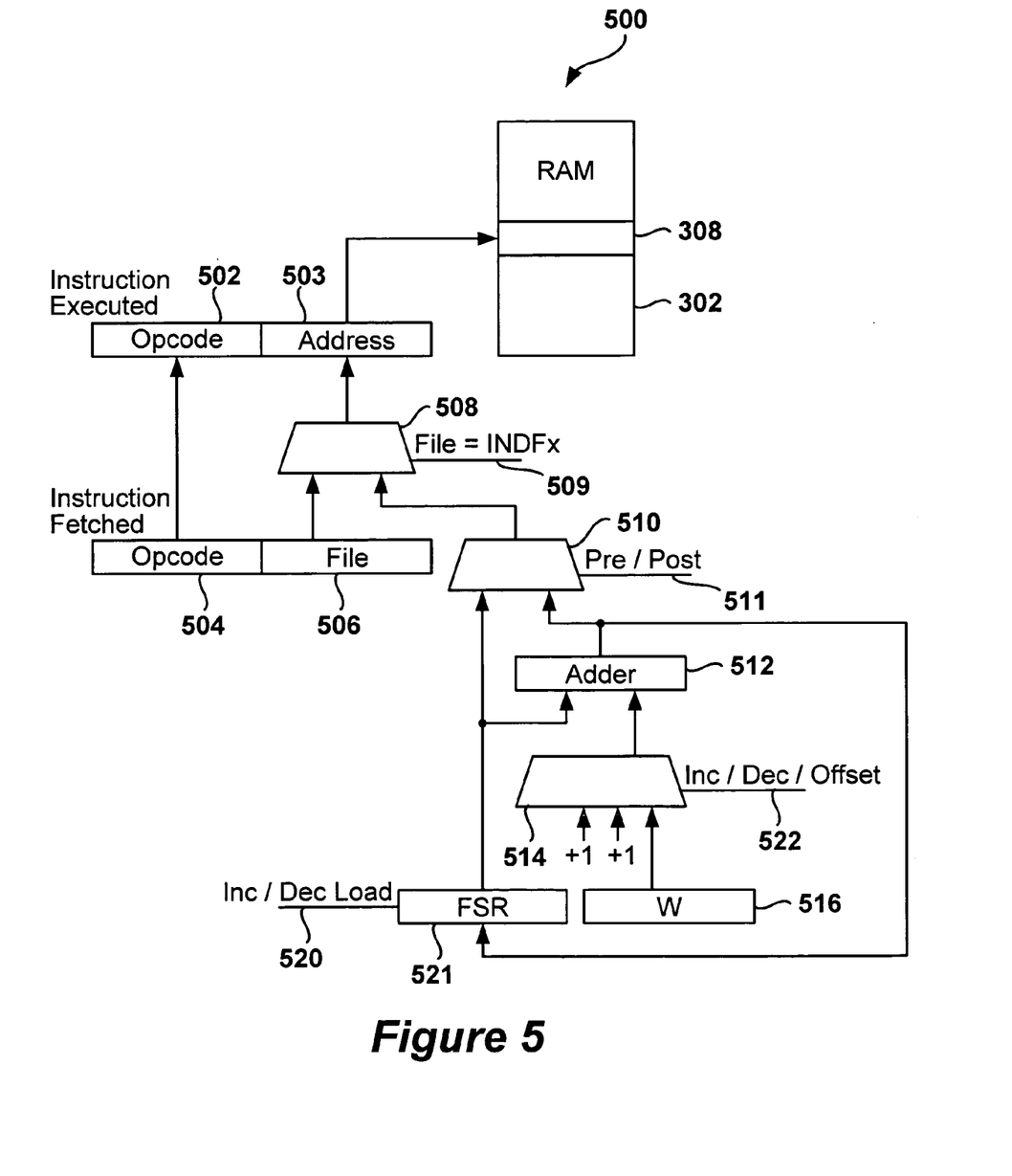
FIG. 5 is a block diagram illustrating a conventional address generation unit.

FIG. 5 is a block diagram of an address generation unit ("AGU"). The address generation unit 500 may be operative with the RAM 302, the latter of which has one or more banks 308. Referring to FIG. 5, there may be an increment/decrement load value 520 input into the FSR 521. The contents of the W register 516 may be offset (by one or more +1 values as illustrated in FIG. 5) and perhaps combined with the increment/decrement offset value 522 into multiplexor ("MUX") 514. The output of MUX 514 can be combined with the value of FSR 512 into the adder 512. The output of the adder 512 may go to MUX 510, and perhaps to the FSR 521. The MUX 510 may take as input the values of the FSR 521 and the adder 512, as well as the pre/post value 511. The output of MUX 510 may be used as input to the MUX 510. The MUX 508 may take as input not only the output of MUX 510, but also the index value 509 and the file portion 506 of the fetched instruction. The output of MUX 508 may be used as the address potion 503 of the executed instruction. The opcode portion 504 of the fetched instruction may be used as the opcode portion 502 of the executed instruction as illustrated in FIG. 5.

Figure 6:
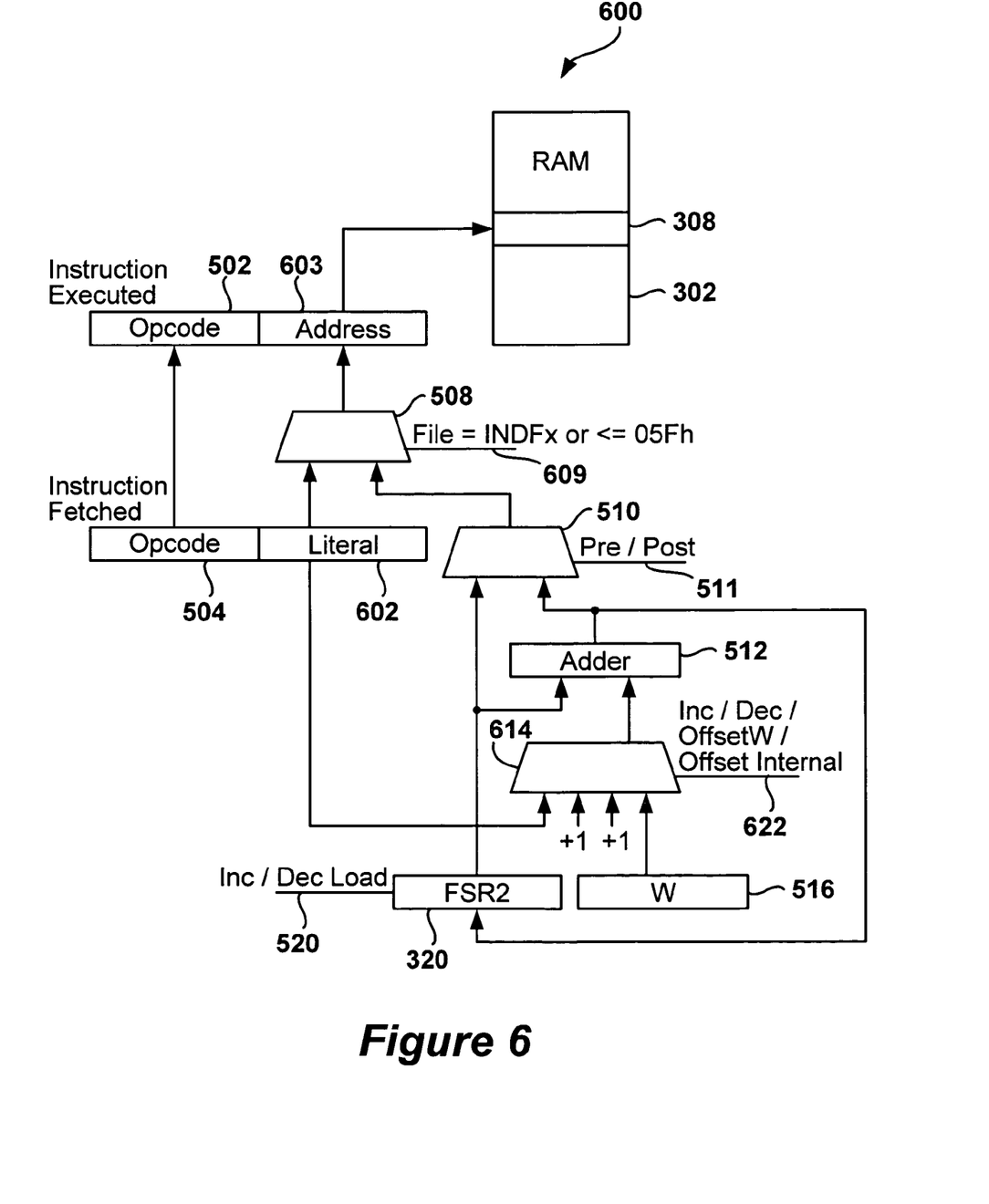
FIG. 6 is a block diagram illustrating another embodiment of an address generation unit according to the teachings of the present invention.

An embodiment of the address generation unit that implements the methods and techniques of the present disclosure is illustrated in FIG. 6. Referring to FIG. 6, an increment/decrement load value 520 may be input into the FSR2 320. The value in the W register 516 may be input, along with one or more +1 values and the increment/decrement/offset/offset internal value 622, into MUX 614. The MUX 614 also takes as input the value of the literal portion 602 of the fetched instruction. The output of the MUX 614 and the value of the FSR2 320 may be used as input to the adder 512. The output of the adder 512 may be used as the input to the MUX 510 and as an input value for the FSR2 320 as illustrated in FIG. 6. In addition to the value from the adder 512, the MUX 510 may also take as input the pre/post value 511 and/or the value from the FSR2 320. The output of the MUX 510 may go to the MUX 508. In addition to the output from the MUX 510, the MUX 508 may also receive as input the file value 609 and/or the literal portion 602 of the fetched instruction. The output of the MUX 508 may be used as the address portion 603 for the executed instruction. The opcode portion 504 of the fetched instruction may be used as the opcode 502 for the executed instruction. As with the embodiment of FIG. 5, the embodiment address generation unit 600 is operative with the RAM 302 and banks 308 as illustrated in FIG. 6.

To implement this addressing mode scheme, extensive changes may be made to the FSR 521 of the address generation unit 500 that existed in prior art microcontrollers (such as the one illustrated in FIG. 5). Earlier microcontrollers would produce an address using 3 different types of indirection (see FIG. 5):

Indirect (INDF)
Indirect with increment/decrement (FSR+), (+FSR), and (FSR−)
Indirect with offset (FSR+W, where the contents of W are used for the offset)

In order to support an index with a literal offset mode, the lower 7-bits of the instruction register 602 may be included as one of four possible values to add to the contents of the FSR2 320. The data contained in the instruction register ("IR") 504/602 may be considered an unsigned integer and the result may NOT stored in the FSR2. Four addressing modes for the embodiment illustrated in FIG. 6 include:

Indirect (INDF)
Indirect with increment/decrement (FSR2+), (+FSR2), and (FSR2−)
Indirect with offset (FSR2+W, where the contents of the W register 516 are used for the offset)
Indirect with literal offset (FSR2 320+literal 602)

The address generation unit 600 of FIG. 6 may thus able to implement the method 400 illustrated in FIG. 6. It will be understood that alternate embodiments of the address generation unit are possible without departing from the spirit of the invention disclosed. Moreover, the method of address mode selection is also capable of variation, again without departing from the spirit of the invention disclosed herein.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A system for using a first address mode to index a literal offset mode, said system comprising:
   one or more banks of random access memory;
   a bank select register for selecting a one of the one or more banks of random access memory, the one or more banks of random access memory further comprising an access portion;
   one or more instructions having one or more addresses, in the one or more banks of random access memory, wherein the one or more instructions have an access bit; and a stack pointer in the one or more banks of random access memory;

wherein when in a first address mode and the access bit is set, the stack pointer uses an address stored in the access portion of the one or more banks of random access memory as an offset during a literal offset address mode.

2. The system of claim 1, wherein the address stored in the access portion of the one or more banks of random access memory is a literal offset of an address in the stack pointer.

3. The system of claim 1, wherein the access bit is set to '1'.

4. The system of claim 1, wherein the access bit is set to '0'.

5. The system of claim 1, wherein the first address mode is direct short addressing mode.

6. The system of claim 1, wherein the first address mode is a direct forced addressing mode.

7. A method for fast access to stack memory, said method comprising:

determining if an access bit is set in one or more instructions;

if the access bit is not set, then selecting a first addressing mode;

if the access bit is set, then:
  decoding the one or more instructions to obtain an address;
  determining if the address is greater than a pre-determined value;

if the address is greater than the pre-determined value, then selecting a second addressing mode, otherwise selecting a third addressing mode.

8. The method of claim 7, wherein the first addressing mode is a direct short addressing mode.

9. The method of claim 7, wherein the second addressing mode is a direct forced addressing mode.

10. The method of claim 7, wherein the third addressing mode is an indexed literal offset addressing mode.

* * * * *